I. S. BARBER.

Machine for Turning Ovals.

No. 1,226. Reissued Sept. 10, 1861.

Witnesses:

Peter Ten Eyck

Inventor:

Robt J Stancher

UNITED STATES PATENT OFFICE.

ROBERT J. MARCHER, OF NEW YORK, N. Y., ASSIGNEE OF I. S. BARBER, OF BOSTON, MASSACHUSETTS.

IMPROVEMENT IN MACHINES FOR CUTTING IRREGULAR FORMS.

Specification forming part of Letters Patent No. 12,884, dated May 15, 1855; Reissue No. 1,226, dated September 10, 1861.

*To all whom it may concern:*

Be it known that I. S. BARBER, of Boston, in the county of Suffolk and State of Massachusetts, did invent new and useful Improvements in Machinery for Cutting Oval and Other Forms, of which the following is a full, clear, and exact description, reference being had to the accompanying drawings, making part of this specification, in which—

Figure 1:
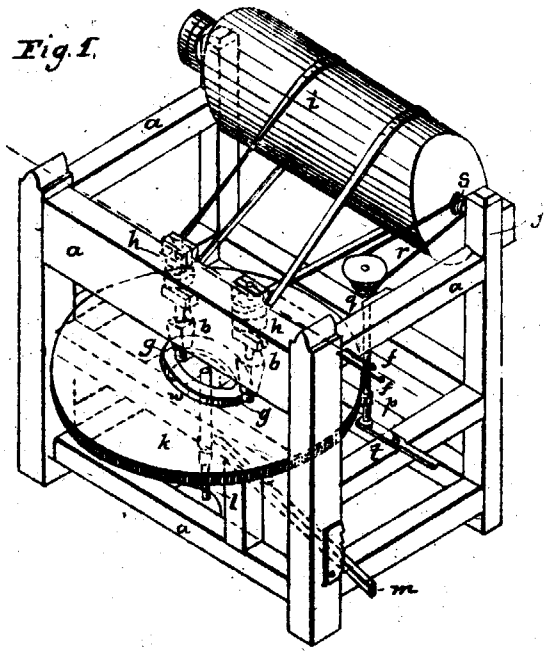
Figure 2:
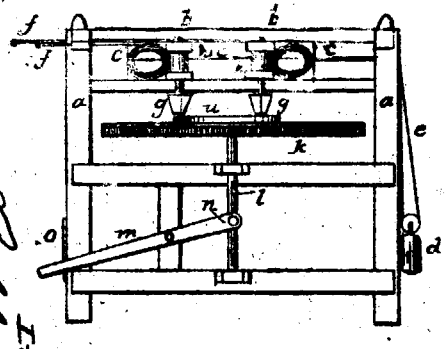

Figure 1 is a perspective view, and Fig. 2 a vertical section.

The same letters indicate like parts in all the figures.

The advantages resulting from the use of rotary cutters for cutting both regular and irregular figures of wood and other materials have long been recognized in the arts; but the application of such cutters to the making of picture and looking-glass and other frames of an oval or other curvilinear form presented serious difficulties not experienced in the making of other articles. Picture and such other frames require to be worked so as to give the general configuration, whether oval or other desired form, and at the same time the moldings must be formed on the outer and on the inner peripheries, and also on the outer face, and the rabbet for the glass, &c., formed on the under face. These requirements presented serious difficulties to be overcome. Before the said invention of the said IRA S. BARBER the only known mode of making such frames was by the use of what is known as the "eccentric lathe" to cause the rough block or frame to travel in an oval or other track while acted upon by non-rotating cutters caused to approach the surface in the same manner as in working on a common turning-lathe, and even if two sets of rotary cutters had been substituted, the above-named difficulties would not have been avoided for the following reasons, viz: In the first place, the eccentric lathe would have to be changed whenever any variation was required in the form of the frame. In the second place, as the shafts of the two sets of cutters would be at a fixed distance from each other, they would require to be shifted and set at a different distance from each other whenever a frame of different width was required to be made, and being so set the distance between them could not be self-adapting to frames of different widths, and hence frames of varying widths along the circuit could not be made; and in the third place, neither of the cutter-shafts being made movable toward and from the inner or outer edge of the rough frame, the cutters could not be made to cut the rabbet or molding on the back face of the frame, nor could they form moldings on the inner or the outer periphery, which require to be "undercut," as it is technically termed. The only mode of applying rotary cutters to this kind of work known prior to the said invention of the said IRA S. BARBER consists in the use of rotary cutters on two parallel shafts, which shafts also carry each a guide or tracing roller, the two shafts being mounted in fixed bearings. The rough frame or block to be wrought is attached to a pattern of the form of the general outline of the intended frame, and these are placed on a table whose plane is at right angles to the axis of the cutter-shafts. By this arrangement the outer edge of the rough frame and pattern are made to approach one set of cutters until the pattern comes in contact with the guide-roller or tracer, and then they are slowly turned to present in succession every part of the circumference, and then drawn back, and the other edge in like manner presented to the other set of cutters. In this way undercut moldings can be framed and a rabbet or other moldings formed on the under face, as well as moldings on the upper face, and any desired width of frame, or frames of varying widths, can be readily made; but this was objectionable, for the reason that it is not automatic, and requires the skill and attention of an experienced operative to present and control the pattern and rough frame, and two operations are required to complete the frame.

By the said invention of the said BARBER all the objections to the above-named method are overcome, while at the same time the machine, which is automatic or self-acting, is adapted to the completion of a frame at one operation; and to these ends the first part of the said invention consists in combining with a table or some equivalent means for rotating the frame to be cut a pattern of the general form of the frame to be produced and two rotating shafts, each carrying a suitable tracer and cutters, one of the said shafts being made by a lateral motion self-adapting to the outer and the other to the inner periphery of the pattern, so that the cutters which by their form and rotation produce the required moldings, shall be guided in the required track to cut the general form of the frame to be produced.

And the second part of the said invention consists in the employment, in combination, of two sets of cutters on parallel shafts so mounted that the distance between the two shafts shall be self adapting by sliding laterally and forced up to the work by a weight or equivalent yielding pressure, whether one or both of the said shafts be so mounted; but this is claimed only in combination with a pattern and tracer or equivalent mechanism for determining the oval or other general form required to be given to the frame.

And the said invention also consists in arranging two parallel cutter-shafts relatively to the table which carries the rough frame in a plane at right angles to the axes of the cutter-shafts, so that the cutter-shafts shall be on opposite sides of the axis of such frame, and one of them outside and the other inside thereof, so that by a movement in one direction both shall be made to act, and by a movement in the reverse direction relieved therefrom, whereby the entire surface of a frame can be cut at one operation without that conflict of the cutters which would be difficult to avoid if the two sets of cutters were on the same side of the axis of the frame.

In the accompanying drawings, *a* represents a suitable frame, and *b b* two vertical and parallel shafts the journals of which run in boxes mounted in carriages *c c*—one for each shaft—the said carriages being adapted to slide horizontally in suitable ways in the frame. By means of a weight, *d*, and a cord, *e*, or other equivalent means, the two carriages *c c* are constantly drawn or forced in one direction, and hence tend constantly to move in that direction, so that either or both of them will yield, when required, in the opposite direction, or may be drawn away by means of rods *f f*, when required. Each of the said shafts is provided at its lower end with a roller or tracer, *g*, and above the rollers with suitable cutters the reverse of the form of the moldings or configuration desired to be produced, the cutters on one being adapted to the molding or form desired to be given to the outer periphery of the frame to be produced, and the other to the inner periphery, including the under rabbet to receive the glass, or picture, if applied to making picture-frames. The said cutter-shafts are each provided with a pulley, *h*, to receive motion by a belt from a drum, *i*, on the driving-shaft *j*.

Below the lower end of the cutter-shafts *b b* there is a circular table, *k*, connected with the upper end of a vertical shaft, *l*, which is adapted to slide vertically in suitable boxes in the frame *a*; and the said table is held at the required elevation or elevated or depressed at the will of the attendant by a lever, *m*, connected in any suitable manner with the shaft. If the table is connected with the upper end of this shaft, so as to turn thereon, the lever *m* may be connected with the shaft by a pin, *n*; but if the table be secured to the shaft so as to turn with it, then the connection of the lever therewith should be by a suitable collar in manner well known to machinists. The table is held at any desired elevation by a notched plate, *o*. The circular periphery of the table is cogged to receive a slow rotary motion from a pinion, *p*, on a vertical shaft, *q*, which shaft receives motion by a belt, *r*, from a pulley, *s*, on the driving shaft, or by other suitable means. The lower end of the said pinion-shaft is pivoted in one end of a lever, *t*, so that the pinion can be engaged with or disengaged from the cogs of the table.

A pattern, *u*, of an oval or any other desired form, is secured to the upper surface of the table, and the rough frame or block of wood, termed a "blank," and previously made of a configuration approximating generally to the form desired to be produced, is secured by suitable means to the pattern or to the table, but in such relations to the pattern that it may receive the action of the cutters while the rollers on the cutter-shafts bear against the pattern.

To attach a blank the table must be let down by the attendant, and after properly securing the block, as indicated, the cutter-shafts are pulled away against the force of the weights *d d*, or other equivalent force—such as springs—by means of the rods *f f*, and so soon as the table is brought to the required elevation the pinion *p* is put in gear, so as to give it a slow rotary motion, and the cutters, which rotate at a high velocity, are liberated by the attendant, and are brought into action by the weights *d d*, or equivalents, one of the said cutters against the inner and the other against the outer periphery of the blank, which is gradually cut away until the tracing-rollers *g g* on the shafts are brought to bear against the inner and the outer peripheries of the pattern, which is thus made to act as a gage and guide during the circuit, the cutters being pressed against the material to be cut away—the wood—until the tracing-rollers come into contact with the pattern, and as the table with the pattern and blank rotates slowly, while the cutters rotate at a high velocity, it follows that at the end of each entire revolution the frame or block will be reduced to the required configuration, both upon the inner and outer periphery and upon the entire face, if the cutters are properly shaped, for, being situated on opposite sides of the axis of the blanks, the cut of one set of cutters may come up to or overlap the cut of the other set without conflict, which could not de done if the two sets of cutters were arranged on the same side of the axis of the pattern. The cutters may be so formed as to cut under as well as on the face of the blank to form a rabbet to receive a picture or looking-glass, in making frames for such purposes, or to make a molding of any kind which may be required to extend to the under surface.

By means of the rotary motion of the table with the pattern or equivalent circuit and the sliding or lateral motion any form of frame can be cut automatically and with accuracy, and by the employment of two shafts, with cutters and tracers, one or both which are made self-adapting in distance, the tracers and cutters are rendered self-adjusting to any width of pattern; and by having the two on opposite sides of the axis of the pattern—one inside and the other outside of the pattern—both the inner and the outer periphery can be cut at the same time, and yet admit of using cutters to cut on the under as well as the upper surface and over the entire surface.

It will be obvious from the foregoing that some parts of the said invention may be used to advantage without others by the substitution of equivalent means—as, for instance, the advantages resulting from the use of two parallel cutter-shafts, with the distance between them self-adapting, may be employed in connection with an eccentric mechanism as a substitute for the pattern and tracer.

I do not claim the rotating cutters, with tracer-rollers on their shafts, nor the employment thereof in combination with and in a fixed relation to a table, as such devices were known prior to the invention of the said IRA S. BARBER.

What I claim as the invention of the said IRA S. BARBER, and desire to secure by Letters Patent, is—

1. The combination of a table, (or equivalent for rotating the frame to be cut, substantially as described,) a pattern of the general form of the frame to be made, and two rotating shafts, each carrying a suitable tracer and cutters, one of the said shafts being self-adapting to the outer and the other to the inner periphery of pattern, substantially as described.

2. The employment of two sets of cutters no parallel shafts, so mounted that the distance between the two shafts shall be self-adapting, substantially as and for the purposes specified, in combination with a pattern and tracers, or equivalent means for determining the oval or other general form, as set forth.

3. Arranging two cutter and tracer shafts on opposite sides of the axis of the rough frame—one on the outside and the other on the inside of such frame—substantially as and for the purposes specified.

ROBT. J. MARCHER.

Witnesses:
PETER VAN ANTWERP,
WM. H. BISHOP.